July 21, 1931.  R. HICKMAN  1,815,474
MEANS FOR PREVENTING FREEZING OF WATER PIPES
Filed Feb. 1, 1927   2 Sheets-Sheet 1

Ross Hickman
INVENTOR

BY Victor J. Evans
ATTORNEY

WITNESS: John Donovan

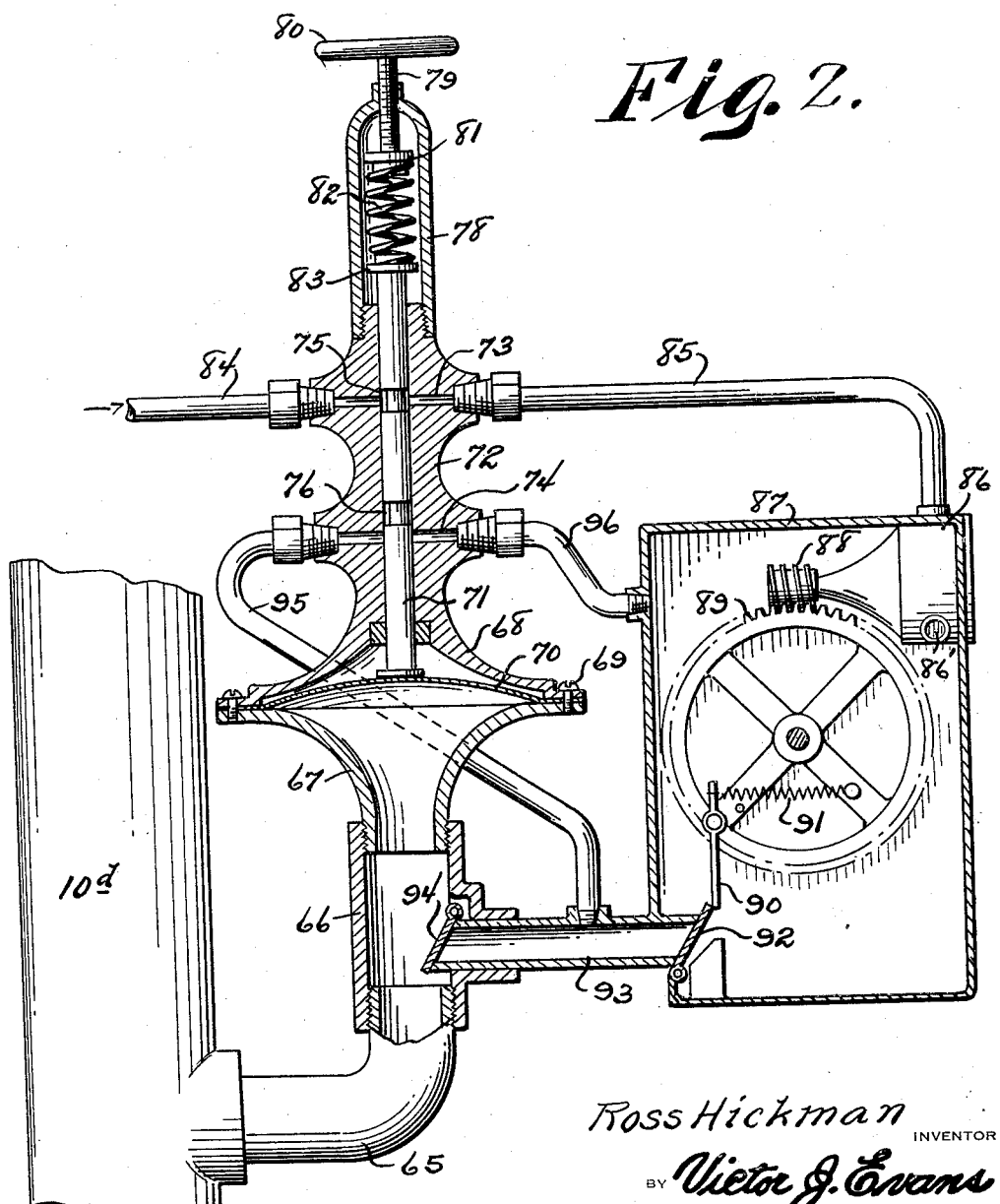

Patented July 21, 1931

1,815,474

UNITED STATES PATENT OFFICE

ROSS HICKMAN, OF WICHITA FALLS, TEXAS

MEANS FOR PREVENTING FREEZING OF WATER PIPES

Application filed February 1, 1927. Serial No. 165,179.

The object of this invention is to prevent the freezing of water pipes, by forcing back under air pressure that portion of the water within a pipe extending from the surface of the ground, or a point above the surface, to a point or level below which freezing does not ordinarily take place.

A further object is to provide for effecting this operation by employing float controlled and air controlled means, in various forms suited for carrying out the broad principle above set forth.

In the drawings forming part of this application,

Figure 2 is a view in vertical section showing a form of air measuring apparatus in which a valve stem or valve member is in co-operation with a diaphragm, the valve member controlling a plurality of ports, one of which permits of the flow of air from a source of supply to an air motor controlling certain valved means described in detail hereinafter.

Figure 1:
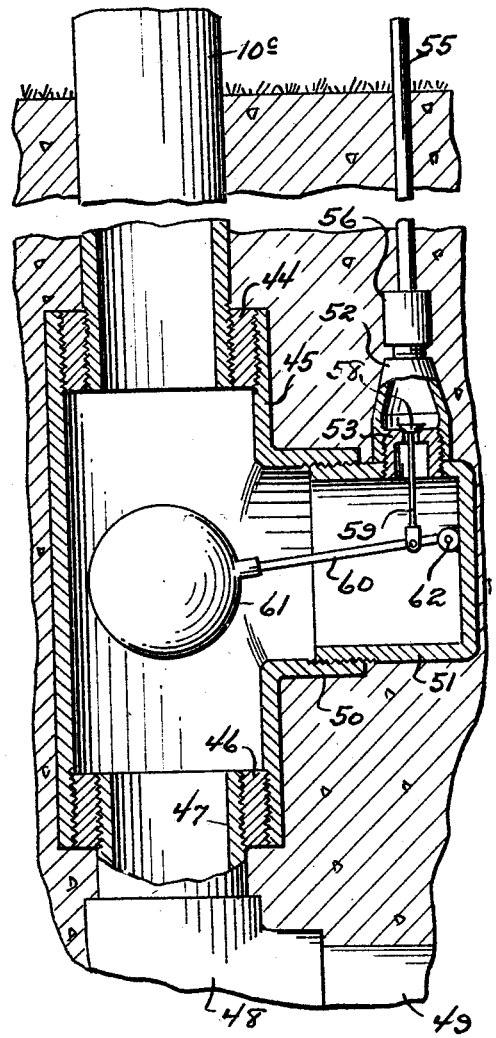
Figure 1 shows one form of the apparatus in vertical section.

In Figure 1 the water pipe is designated 10c and is threaded into bushing 44, the latter being threaded into T-connection 45. A bushing 46 at the opposite end of the T-connection has threaded connection with element 47, and the latter is connected with elbow 48 having communication with water pipe 49.

The portion 50 of the T-connection is internally threaded, and a cap or the like 51 extends into element 50, and mounts a valve casing or the like 52 in which an adjustable seat member 53 is mounted, this element last named extending into the wall of cap 51.

Air under pressure is admitted thru pipe 55 connected with the valve casing 52, by coupling or union 56. The valve 58 is carried by stem 59, and the latter is controlled by arm 60 having connection with float 61. Arm 60 is pivoted at 62 to the inner wall of cap 51.

The rise of water thru pipe 10c, the water passing thru the T-connection, will raise float 61 and open valve 58. When it is desired to free the pipe 10c of water, any hydrant or the like being connected with said pipe 10c, air is forced downwardly thru pipe 55, flowing past open valve 58, into the T-connection, and thence into the main water pipe for the purpose of driving the water back after the hydrant is closed.

In Figure 2 I have illustrated a water pipe 10d having connection by means of elbow 65 with tubular member 66 of substantially T-form. Connected with element 66 is an outwardly flared or funnel-like member 67 constituting the lower portion of a diaphragm casing, the upper portion of which is designated 68, and the flanges of these elements 67 and 68 are connected by screws or the like 69. The diaphragm mounted within this casing is shown at 70, and a stem 71, or plunger, movable with the diaphragm.

The casing or body 72 is provided with a tubular bore in which stem or plunger 71 operates, and the body 72 is further provided with transverse bores 73 and 74, extending entirely thru the element 72, in a direction perpendicular to that in which the bore for plunger 71 extends. This element 71 is reduced to provide the equivalent of ports at 75 and 76 adapted for cooperation with the bores 73 and 74.

A tubular element 78 is connected with the upper portion of body 72, and a screw 79 controlled by wheel 80 extends thru the upper portion of element 78 and said screw, or a head 81 thereon bears on spring 82, the latter resting on collar 83 on the upper end of stem or plunger 71.

Compressed air from any source of supply is admitted thru pipe 84, the air passing thru ports 75 and 73 and thence thru pipe 85 to an air motor 86 mounted within casing 87. The motor shown conventionally drives a worm 88 meshing with worm wheel 89, and the latter carries a pivoted element 90, resiliently mounted by means of spring 91, or any other suitable projecting flexible element may be substituted for said element 90. This element last named, upon the rotation of wheel 89 to the required position, under action of the air motor 86, will raise and close pivoted valve 92, thereby cutting off communication between air chamber 87 and duct 93 which extends into the T-connection 66. A valve 94 pivoted as shown, and constituting a check valve, prevents return flow thru duct 93. Pipe 95 extends from port 74 of casing or body 72, and has connection with duct 93, and a pipe 96 also in communication with bore or port 74, and positioned opposite the point of connection with pipe 95,—extends to and has communication with chamber 87, near the upper portion thereof.

When water is cut off at any hydrant or discharge device assumed to have connection with water pipe 10d, pressure will rise below diaphragm 70, raising it and allowing pressure from any source of air supply to flow thru pipe 84 to opposite pipe 85, and to the air motor 86. The motor will rotate wheel 89, thru the worm gearing, sufficiently to bring the flexibly mounted valve engaging device 90 into contact with valve 92, closing the latter and closing passage or duct 93.

However, air flowing to the chamber within casing 87 will pass valve 92 until the latter is closed by the worm gearing, as specified, and this air being confined in pipe 10d by the closed hydrant, will force the water back to a point where freezing will be prevented.

Air pressure in chamber 87, admitted at 86', holds valve 92 closed until the hydrant assumed to have connection with pipe 10d is opened. This lowers the pressure under diaphragm 70, and spring 82 forces plunger 71 downwardly, opening ports 76 and 74 and closing port 75. Pressure is then equalized in chamber 87 and passage 93, because of communication between pipes 96 and 95. This causes valve 92 to fall to open position.

Upon again closing the hydrant or discharge device connected or assumed to be connected with the pipe 10d, and discontinuing the flow of water from this pipe, water pressure below diaphragm 70 raises the latter, so that port 75 is again in the position of Figure 5, and air again flows to motor 86 and chamber 87. Each time this complete operation takes place, a measured quantity of air is allowed to flow thru pipe 65 to pipe 10d forcing the water back below the frost line or freezing level.

Having described the invention what is claimed is:—

1. The combination with a water supply line extending from a point below the surface of the ground and below the frost line to a point above the surface, of water controlled and air controlled means functioning automatically to cause the water to be forced back below the frost line by air pressure and rendering effective a measured quantity of air for holding said water below the frost line, time required to force back said water being determined by the time necessary for the mechanical operation of said means.

2. The combination as defined by claim 1, and means for supplying air to said controlling means.

In testimony whereof I affix my signature.

ROSS HICKMAN.